United States Patent Office 3,064,779
Patented Nov. 20, 1962

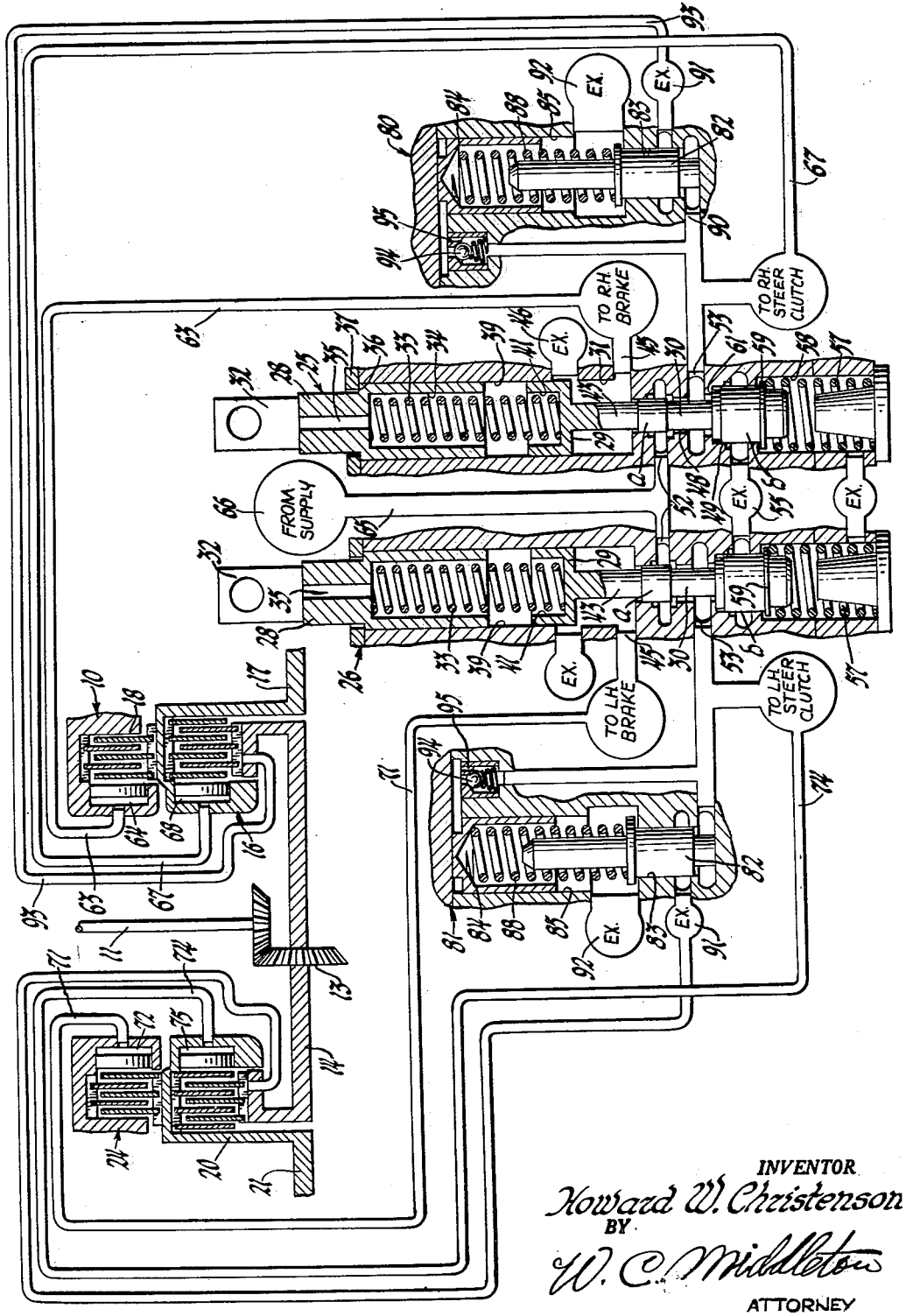

3,064,779
TRANSMISSION
Howard W. Christenson, Indianapolis, Ind., assignor to General Motors Corporation, Detroit, Mich., a corporation of Delaware
Continuation of application Ser. No. 603,519, Aug. 13, 1956. This application Feb. 24, 1960, Ser. No. 10,803
17 Claims. (Cl. 192—85)

This invention relates to a transmission and more particularly to a control system having a fluid pressure control valve to control the fluid pressure supplied to a fluid motor employed to engage a friction device to effect a drive. This application is a continuation of S. N. 603,519, filed August 13, 1956 by Howard W. Christenson, now abandoned.

The fluid pressure control or trimmer valve is illustrated in a final drive transmission having a cross shaft which may be connected to either or both of the driving wheels by the right and left-hand driving and steering clutches. The trimmer valve may be employed to control the pressure rise during drive engagement of any fluid motor employed to engage a friction device to engage the drive mechanism in a transmission device such as a direct drive clutch or a multi-ratio transmission having drive ratios established by the engagement of suitable clutches or bands. The trimmer valve is connected to the fluid supply line connected directly to the fluid motor. During the initial application of fluid to the motor, the trimmer valve permits exhaust at a low pressure to initially limit the pressure supplied to the fluid motor. At the same time, the fluid pressure delivered to the fluid motor is also conducted through a restricted orifice to act on a piston which increases the biasing force acting on the trimmer valve. Thus, the line pressure is increased. Since the rate of flow of fluid through the restricted passage increases with the increased line pressure, the line pressure is increased at an increasing rate until full line pressure is obtained. Thus, the pressure supplied for clutch engagement is regulated by the trimmer valve to gradually supply an increasing pressure to the clutch in accordance with the pressure supplied by the control valve and the time this pressure is supplied in order to avoid sudden and jarring clutch engagement of the clutch.

An object of the invention is to provide in a fluid control system for establishing a drive in a transmission mechanism, a fluid pressure control mechanism for initially supplying a low pressure to initially engage the drive and thereafter supplying a high pressure for final engagement of the drive.

Another object of the invention is to provide in a hydraulic control system for establishing a drive in a transmission mechanism, a fluid pressure control device for initially establishing a low pressure to engage the drive mechanism and thereafter during engagement increasing the fluid pressure at an increasing rate until full line pressure is obtained to hold the drive mechanism engaged.

Another object of the invention is to provde in a transmission mechanism having a fluid-operated motor effective to engage a drive, a control valve to control the pressure rise in the fluid motor in accordance with the pressure supplied to the fluid motor and the duration of time the pressure is supplied to the fluid motor.

Another object of the invention is to provide in a transmission mechanism having a fluid motor operable to engage a drive mechanism, a pressure control valve which, during the initial stage of operation of the fluid motor, provides a low pressure and which, in response to the pressure supplied to the fluid motor and the duration of time this pressure is supplied, increases the spring force acting on the valve to increase the pressure supplied to the fluid motor to line pressure.

These and other objects of the invention will be more apparent to those skilled in the art from the following description of the preferred embodiment of the invention illustrated in the accompanying drawings, in which:

A schematic view of the transmission and the control system is shown.

The final drive transmission 10, which is shown schematically, is driven by the output shaft 11 of any suitable multi-ratio transmission (not shown). The shaft 11 is connected by bevel gear set 13 to the cross shaft 14 which is connected at the right side of the driving and steering fluid-operated clutch 16 to drive the wheel shaft 17. The fluid and mechanically operated brake 18 is connected to the wheel shaft 17. At the left side of the vehicle, the cross shaft 14 is connected by the driving and steering fluid-operated clutch 20 to the wheel shaft 21 which is also connected to the fluid operated brake 24. The specific construction of the clutches and brakes will be described below.

The right-hand steering control unit consisting of clutch 16 and brake 18 is controlled by the right-hand control valve 25 and the left-hand steering control unit consisting of clutch 20 and brake 24 is controlled by the left-hand control valve 26. These control valves are actuated by independent manually controlled levers which may be moved independently or in unison to control one or both of the control units. The valves 25 and 26 may also be controlled by a single lever having a linkage arranged so that the valves may be operated in unison or independently. Since the steering control valves are identical, the following detailed description of the structure and operation of these valves is made in relation to the right-hand steering control valve which also applied to the left-hand valve 26 where like parts are identified with the same reference numerals.

The valve 25 consists of an actuating plunger 28, a cup member 29, and a valve element 30 located in a bore 31. The valve is actuated by a linkage connected to stem 32 of the plunger 28 which engages the spring 33 located in a hollow portion 34 of the plunger. Plunger has a vent opening 35 to exhaust the space between the plunger and cup and a shoulder 36 which engages the stop 37 to limit upward movement of the plunger. The plunger 28 and cup 29 are located in a bore portion 39 of large diameter. The spring 33 fits in a recess 41 in cup 29 and normally holds the stem 43 of the cup in engagement with the valve element 30. With the valve in the normal position engaging the clutch as shown the brake apply port 45 located at the lower end of the bore 39 and the exhaust port 46 located adjacent the cup 29 are open connecting brake line 63 to exhaust to release the brake.

Valve element 30 has a small diameter land *a* and a large diameter land *b* located respectively in the bore portions 48 and 49. With the valve in the clutch engaged position shown, the main line port 52 is connected adjacent land *a* through the space between the lands *a* and *b* to the clutch port 53 located adjacent land *b* and the exhaust 55 is blocked by land *b*. The distance between lands *a* and *b* is equal to the distance between line port 52 and exhaust port 53. A spring 57 seated in the closed end of the spring chamber portion 58 of the bore 31 engages a washer 59 on land *b* to urge valve 30 upwardly until the upper end of land *b* engages the shoulder 61 between stepped bores 48 and 49.

The right-hand steer valve 25 has a brake port 45 connected by brake line 63 to the servo motor 64 of the right-hand brake 18, a main line port 52 connected by main line 65 to the fluid supply 66 and a clutch port 53 connected by the right-hand clutch line 67 to the fluid motor 68 for the right-hand clutch 16. Similarly the left-hand steer control valve 26 has a brake port 45 connected by the brake line 71 to the brake motor 72, a main line port 52 connected by main line 65 to the fluid supply 66, and a clutch port 53 connected by the left-hand clutch line 74 to the left-hand clutch motor 75.

The right and left-hand clutch lines 67 and 74 are connected respectively to the right-hand trimmer valve 80 and left-hand trimmer valve 81. Since these valves are identical, like reference numerals are used on each valve. The trimmer valve element 82 is located in a small diameter bore portion 83 and the piston 84 is located in the larger diameter bore portion 85. The piston 84 and the valve element 82 are urged by a spring 88 toward opposite ends of the closed bore 83—85. The steer clutch line 67 is connected to the port 90 at the lower end of the bore 83 and acts on the free end of valve 82. With the valve in the closed position shown, the valve 82 blocks exhaust 91 which may be connected by line 93 to the clutch controlled by the trimmer valve to supply cooling and lubricating oil to the clutch during engagement. Exhaust 92 is continuously opened to vent the space between the valve 82 and piston 84. The steer clutch line 67 is also connected through the orifice 95 to supply fluid to the end of the bore 85 to move the piston 84 toward the valve element 83 since one-way check valve 94 is closed when the clutch is applied. The one-way check valve 94 exhausts fluid from the end of bore 85 on clutch release.

The details of the right and left-hand driving and steering clutches 16 and 20 and the right and left-hand brakes 18 and 24 are shown in a co-pending application of Howard W. Christenson and Ulysses A. Breting, Serial No. 581,654, filed April 30, 1956 now Patent No. 2,941,639, granted June 21, 1960.

*Operation*

When the engine is started a fluid supply 66, such as the engine driven or input driven pump of the transmission used with this final drive transmission supplies fluid under pressure to the main line 65 and ports 52 of both the right-hand control valve 25 and the left-hand control valve 26. The valves in their normal position supply oil to both of the driving and steering clutches, the right-hand one 16 and the left-hand 20 to connect the final drive transmission to drive the vehicle. The valves 25 and 26 may be moved together or independently to provide either a straight drive or a steering drive. For example, in order to make a right turn a right-hand steering and driving valve 25 is depressed to first decrease the degree of engagement of the driving clutch 16 to lessen the power transmitted to the right wheel. This will effect a moderate turn under light load conditions and a sharpen turn under heavier load conditions. If a more severe turn is necessary, the valve 25 is further depressed to completely disengage the clutch 16. For extremely sharp turns or turns under downhill coasting conditions, the brake 18 is applied by further movement of the valve. Thus this valve arrangement provides a very sensitive and controllable steering arrangement for the vehicle providing a wide range of steering controlled to meet all situations encountered in vehicle operation. The vehicle is braked to stop the vehicle during normal operation by moving both valves in unison to the brake-on position.

Since both the right and left-hand valves operate in the same manner, the details of operation of the right-hand valve described below apply to both valves.

With the valve 25 in the released position shown with the actuating plunger 28 in its uppermost position where the shoulder 36 engages the stop 37, the fluid supply 66 is connected by port 52 between the lands *a* and *b* of valve element 30 to the port 53 which is connected to the right-hand steer clutch line 67. The stem of valve 30 between lands *a* and *b* is large so that the fluid flow space between the stem and the surrounding bore 48 is small and acts as an orifice to prevent an excessive pressure drop in the main line 66 of the control system and to control the pressure rise in the clutch motor 68. As will be explained below, the pressure rise in the steer clutch servo motor 68 is also controlled by the trimmer or pressure regulating valve 80. With the valve in this initial position, the right-hand brake line 63 is connected by port 45 between the space between the land *a* and the cup 29 to exhaust 46 to release the brake.

In order to release the clutch and apply the brake, the valve 25 is actuated by moving the plunger 28 into the bore to reduce the clutch pressure and in an intermediate position exhausts the clutch and brake, and then to increase the brake pressure.

When the valve is moved from the normal position shown in which fluid from the supply 66 is connected between the lands *a* and *b* to the clutch line 67, the plunger 28 applies an additional force through spring 33 to the valve element 30 so that the land *a* may close inlet port 52, and the clutch line 67 may be connected between the lands *a* and *b* to the exhaust port 55 to disengage the clutch 16. During further movement of the valve, the clutch remains disengaged. Brake engagement is initiated when the land *a* moves below the main line inlet port 52 and admits fluid to the space between the land *a* of valve element 30 and the cup 29 to the brake port 45. It will be noted that when land *a* moves below exhaust inlet port 52 that the exhaust port 46 is simultaneously closed.

It will also be noted that the valve element 30 is biased between springs 57 and 33 in order to provide during this movement of the valve a gradual decrease of the clutch pressure and a gradual increase of the brake pressure. This aspect of the operation of the valve and a complete explanation of the forces required to move the valve which provide operator feel are more fully explained in the above-mentioned co-pending application Serial No. 581,654.

When a steering clutch is applied by the steering valves 25 and 26, the fluid flowing through the line 67 is also connected to a trimmer or pressure regulating valve 80 or 81. These valves work in exactly the same manner and thus the operation of only the right clutch valve 80 is described herein. When pressure is initially supplied to the clutch motor 68 via line 67, it is also connected at port 90 to the trimmer valve 80. As the fluid is initially supplied, the pressure is very low due to the flow restriction of fluid flowing to the motor, but quickly increases to a low regulated value controlled by a spring 88 when abutting the piston 84 in the end position shown. At the low regulated pressure the spring permits movement of valve 82 to exhaust the excess fluid through exhaust port 91. Exhaust 91 may be connected by line 93 to exhaust at the clutch. Thus, this excess fluid may be supplied to the clutch for cooling and lubrication. Since the volume of excess fluid is large during initial clutch application and is gradually reduced during engagement and is cut off when engagement is completed, this fluid supply is ideal for clutch cooling and lubrication. This low regulated pressure value which is built up in line 67 is also connected through orifice 95 to the other end of the valve 80. The volume of flow through orifice 95 is proportional to the pressure in line 67 and the time during which the pressure is present. The fluid flow through the orifice 95 creates a pressure in the bore 85 acting on the piston 84 to move the piston inwardly to increase the force of spring 88 acting on the valve 83 and thus increase the pressure in line 67. As the pressure in line 67 is increased, the volume of flow per unit of time or rate of flow through orifice 95 is increased, so that the rate of increase of the pressure is progressively or continuously increased until main line pressure is attained. Thus, the initial portion of clutch engagement occurring at a lower regulated pressure which is increasing at a slow rate is slow for soft clutch engagement and the final portion of the clutch engagement occurring at a higher regulated pressure which is increasing at a fast rate is firm and fast to prevent slipping.

When the clutch motor 64 is exhausted via line 67 and port 55, the fluid in the bore 85 of the trimmer valve 80 is expelled by the spring 88 and quickly passes through the one-way check valve 94 to the clutch line 67 and then through the steer valve 25 to exhaust 55 so that on each exhaust of the brake fluid motor, trimmer valve 80 is conditioned for another clutch application.

The trimmer valves described above may be connected to the fluid motor supply line between the fluid motor and a manually or automatically controlled control valve in a transmission system where the fluid motor is employed to engage either a clutch of the direct drive or ground type or a band to effect a direct drive or a ratio engagement in a transmission device. In applications of this nature, the trimmer valve will operate in the same way to provide an initial low pressure for soft initial clutch engagement to prevent shock and a high final pressure to prevent slip during drive.

The above-described preferred embodiment is illustrative of the invention and as will be appreciated by those skilled in the art is subject to modification within the scope of the appended claims.

I claim:

1. In a transmission, a fluid operated drive engaging device, a source of fluid under a high regulated pressure, supply line means connecting said source to said device having a pressure value the same under static conditions and proportional under flow conditions to the pressure value in said device, control valve means to control the supply of fluid from said source through said supply line means to said device, a pressure regulating valve having a movable element, means to connect said supply line means to said pressure regulating valve to supply fluid to urge said movable element to move in one direction, biasing means providing a normal biasing force to urge said movable element to move in the opposite direction, said regulating valve having vent means operative in response to movement of said movable element in said one direction by said fluid from said supply line means to vent said supply line means and to movement in said opposite direction by said normal biasing force to close said vent means to initially regulate the fluid pressure in said supply line and said device at one positive pressure value, and means responsive to a fluid pressure proportional to said regulated fluid pressure regulated by said regulator valve operatively connected to said biasing means to provide a continuous, gradual slope change of said biasing force at a controlled slow rate of change over an extended period of time to change said biasing force from said normal biasing force to another biasing force to change the fluid pressure in said supply line means and said device from said one value at a gradual slope rate of pressure change to another regulated pressure over said extended period of time to gradually and softly engage said drive engaging device.

2. In a transmission, a fluid operated drive engaging device, a source of fluid under a high regulated pressure, supply line means connecting said source to said device having a pressure value the same under static conditions and proportional under flow conditions to the pressure value in said device, control valve means to control the supply of fluid from said source through said supply line means to said device, a pressure regulating valve having a movable element, means to connect said supply line means to said pressure regulating valve to supply fluid to urge said movable element to move in one direction, biasing means providing a normal biasing force to urge said movable element to move in the opposite direction, said regulating valve having vent means operative in response to movement of said movable element in said one direction by said fluid from said supply line means to vent said supply line means and to movement in said opposite direction by said normal biasing force to close said vent means to initially regulate the fluid pressure in said supply line and said device at a low initial positive pressure value, and means responsive to a fluid pressure proportional to said regulated fluid pressure regulated by said regulator valve operatively connected to said biasing means to provide a continuous, gradual slope increase of said biasing force at a controlled slow rate of change over an extended period of time to increase said biasing force from said normal biasing force to a maximum biasing force to increase the fluid pressure in said supply line means and said device from said low initial value at a gradual slope rate of pressure increase to said high regulated pressure of said source over said extended period of time to gradually and softly engage said drive engaging device.

3. In a transmission, a fluid operated drive engaging device, a source of fluid under a high regulated pressure, supply line means connecting said source to said device having a pressure value the same under static conditions and proportional under flow conditions to the pressure value in said device, control valve means to control the supply of fluid from said source through said supply line means to said device, a pressure regulating valve having a movable elemnet, means to connect said supply line means to said pressure regulating valve to supply fluid to urge said movable element to move in one direction, biasing means providing a normal biasing force to urge said movable element to move in the opposite direction, said regulating valve having vent means connected to said supply line means both upstream and downstream of said regulator valve operative in response to movement of said movable element in said one direction by said fluid from said supply line means to vent said supply line means both upstream and downstream of said regulator valve and to movement in said opposite direction by said normal biasing force to close said vent means to initially regulate the fluid pressure in said entire supply line and said device at a one initial positive pressure value, and means responsive to a fluid pressure proportional to said regulated fluid pressure regulated by said regulator valve operatively connected to said biasing means to provide a continuous, gradual slope change of said biasing force throughout the entire change of said biasing force at a controlled slow rate of change over an extended period of time to change the fluid pressure in said supply line means and said device from said one initial value at a gradual slope rate of pressure increase to another regulated pressure over said extended period of time to gradually and softly engage said drive engaging device.

4. In a transmission, a fluid operated drive engaging device, a source of fluid under a high regulated pressure, supply line means connecting said source to said device having a pressure value the same under static conditions and proportional under flow conditions to the pressure value in said device, control valve means to control the supply of fluid from said source through said supply line means to said device, a pressure regulating valve having a movable element, means to connect said supply line means to said pressure regulating valve to supply fluid to urge said movable element to move in one direction, biasing means providing a normal biasing force to urge said movable element to move in the opposite direction, said regulating valve having vent means connected to said supply line means both upstream and downstream of said regulator valve operative in response to movement of said movable element in said one direction by said fluid from said supply line means to vent said supply line means both upstream and downstream of said regulator valve and to movement in said opposite direction by said normal biasing force to close said vent means to initially regulate the fluid pressure in said entire supply line and said device at a low initial positive pressure value, and means responsive to a fluid pressure proportional to said regulated fluid pressure regulated by said regulator valve operatively connected to said biasing means to provide a continuous, gradual slope increase of said biasing force at a controlled slow rate of change throughout the entire change of said biasing force over an extended period of time to increase the fluid pressure in said supply line means and said device from said low initial value at a gradual slope rate of pressure increase to said high regulated pressure of said source over said extended period of time to gradually and softly engage said drive engaging device.

5. The invention defined in claim 1 and one-way by-pass means by-passing said orifice to provide rapid return flow around said orifice from said motor means to said supply line means and device to quickly re-establish said normal biasing force.

6. The invention defined in claim 3, said fluid operated drive engaging device having friction means, and cooling passage means connecting said vent means to said friction means to supply fluid to cool said friction means.

7. In a transmission; a fluid operated drive engaging device; a source of fluid under a high regulated pressure; supply line means connecting said source to said device having a pressure value the same under static conditions and proportional under flow conditions to the pressure value in said device; control valve means to control the supply of fluid from said source through said supply line means to said device; a pressure regulating valve having a movable element; means to connect said supply line means to said pressure regulating valve to supply fluid to urge said movable element to move in one direction; biasing means providing a normal biasing force to urge said movable element to move in the opposite direction; said regulating valve having vent means operative in response to movement of said movable element in said one direction by said fluid from said supply line means to vent said supply line means and to movement in said opposite direction by said normal biasing force to close said vent means to initially regulate the fluid pressure in said supply line and said device at one positive pressure value; and control means having motor means and a fixed area orifice connecting a fluid pressure proportional to said regulated fluid pressure regulated by said regulator valve in said supply line means and device for flow to said motor means, and said motor means being operatively connected to said biasing means to provide, during flow through said orifice to said motor means, a continuous gradual slope change of said biasing force at a controlled slow rate of change over an extended period of time to change the fluid pressure in said supply line means and said device from said one positive pressure value at a gradual slope rate of pressure change to another positive pressure value over said extended period of time to gradually and softly engage said drive engaging device, and one of said pressure values being the regulated pressure of said source.

8. In a transmission; a fluid operated drive engaging device; a source of fluid under a high regulated pressure; supply line means connecting said source to said device having a pressure value the same under static conditions and proportional under flow conditions to the pressure value in said device; control valve means to control the supply of fluid from said source through said supply line means to said device; a pressure regulating valve having a movable element; means to connect said supply line means to said pressure regulating valve to supply fluid to urge said movable element to move in one direction; biasing means providing a normal biasing force to urge said movable element to move in the opposite direction; said regulating valve having vent means operative in response to movement of said movable element in said one direction by said fluid from said supply line means to vent said supply line means and to movement in said opposite direction by said normal biasing force to close said vent means to initially regulate the fluid pressure in said supply line and said device at a low positive pressure value; and control means having motor means and a fixed area orifice connecting a fluid pressure proportional to said regulated fluid pressure regulated by said regulator valve in said supply line means and device for flow to said motor means, and said motor means being operatively connected to said biasing means to provide, during flow through said orifice to said motor means, a continuous gradual slope increase of said biasing force at a controlled slow rate of change over an extended period of time to increase the fluid pressure in said supply line means and said device from said low positive pressure value at a gradual slope rate of pressure increase to said high regulated pressure of said source over said extended period of time to gradually and softly engage said drive engaging device.

9. In a transmission; a fluid operated drive engaging device; a source of fluid under a high regulated pressure; supply line means connecting said source to said device having a pressure value the same under static conditions and proportional under flow conditions to the pressure value in said device; control valve means to control the supply of fluid from said source through said supply line means to said device; a pressure regulating valve having a movable element; means to connect said supply line means to said pressure regulating valve to supply fluid to urge said movable element to move in one direction; biasing means providing a normal biasing force to urge said movable element to move in the opposite direction; said regulating valve having vent means operative in response to movement of said movable element in said one direction by said fluid from said supply line means to vent said supply line means and to movement in said opposite direction by said normal biasing force to close said vent means to initially regulate the fluid pressure in said supply line and said device at a low positive pressure value; and control means having motor means with a movable wall mounted for movement through a limited distance and a fixed area orifice connecting a fluid pressure proportional to said regulated fluid pressure regulated by said regulator valve in said supply line means and device for flow to said motor means to continuously move said movable wall at a substantially uniform rate completely through said limited distance during the entire period of flow through said orifice, and said motor means being operatively connected to said biasing means to provide, during movement through said limited distance, a continuous uniform rate of increase of said biasing froce from said normal biasing force to a maximum biasing force at a uniform rate of change over an extended period of time coextensive with movement of said movable wall to increase the fluid pressure in said supply line means and said device from said low initial value at a continuous gradual slope rate of pressure increase to said high regulated pressure of said source over said extended period of time to gradually and softly engage said drive engaging device.

10. In a transmission; a fluid operated drive engaging device; a source of fluid under a high regulated pressure; supply line means connecting said source to said device having a pressure value the same under static conditions and proportional under flow conditions to the pressure value in said device; control valve means to control the supply of fluid from said source through said supply line means to said device; a pressure regulating valve having a movable element; means to connect said supply line means to said pressure regulating valve to supply fluid to urge said movable element to move in one direction; biasing means providing a normal biasing force to urge said movable element to move in the opposite direction; said regulating valve having vent means operative in response to movement of said movable element in said one direction by said fluid from said supply line means to vent said supply line means and to movement in said opposite direction by said normal biasing force to close said vent means to initially regulate the fluid pressure in said supply line and said device at a low positive pressure value; and control means having an expansible chamber motor means expansible from a fully contracted position to a fully expanded position and a fixed area orifice means connecting a fluid pressure proportional to said regulated fluid pressure regulated by said regulator valve in said supply line means and device for flow to said motor means to continuously expand said motor means at a substantially uniform rate completely from said fully contracted to said fully expanded position during the entire period of flow through said orifice and to maintain said motor means filled regardless of the pressure in said supply line means, and said motor means being operatively connected to said biasing means to provide, during flow through said orifice to said motor means moving said movable wall, a continuous uniform rate of increase of said biasing force at a controlled slow rate of change over an extended period of time coextensive with expansion of said motor means to increase the fluid pressure in said supply line means and said device from said low initial value at a gradual slope rate of pressure increase to said high regulated pressure of said source over said extended period of time to gradually and softly engage said drive engaging device.

11. In a transmission; a fluid operated drive engaging device; a source of fluid under a high regulated pressure; supply line means connecting said source to said device having a pressure value the same under static conditions and proportional under flow conditions to the pressure value in said device; control valve means to control the supply of fluid from said source through said supply line means to said device; and a pressure regulating valve having a movable element; means to connect said supply line means to said pressure regulating valve to supply fluid to urge said movable element to move in one direction; biasing means providing a normal biasing force to urge said movable element to move in the opposite direction; said regulating valve having vent means connected to said supply line means both upstream and downstream of said regulator valve operative in response to movement of said movable element in said one direction by said fluid from said supply line means to vent said supply line means both upstream and downstream of said regulator valve and to movement in said opposite direction by said normal biasing force to close said vent means to initially regulate the fluid pressure in said supply line and said device at a low positive pressure value; and control means having motor means and a fixed area orifice connecting a pressure proportional to said regulated fluid pressure regulated by said regulator valve in said supply line means and device for flow to said motor means, and being operatively connected to said biasing means to provide, during flow through said orifice to said motor means, a continuous gradual slope increase of said biasing force at a controlled slow rate of change over an extended period of time to increase the fluid pressure in said supply line means and said device from said low inital value at a gradual slope rate of pressure increase to said high regulated pressure of said source over said extended period of time to gradually and softly engage said drive engaging device.

12. The invention defined in claim 7 and one-way by-pass means by-passing said orifice to provide rapid return flow around said orifice from said motor means to said supply line means and device to quickly re-establish said normal biasing force.

13. The invention defined in claim 11, said fluid operated drive engaging device having friction means, and cooling passage means connecting said vent means to said friction means to supply fluid to cool said friction means.

14. In a transmission; a fluid operated drive engaging device; a source of fluid under a high regulated pressure; supply line means connecting said source to said device having a pressure value the same under static conditions and proportional under flow conditions to the pressure value in said device; control valve means in said supply line means to control the supply of fluid from said source through said supply line means to said device to cause, on the initiation of the supply of pressure fluid from said source to said device, a pressure drop in a portion of said supply line means to a pressure value at least as low as a predetermined low positive pressure value; a pressure regulating valve having a movable element; means to connect said supply line means to said pressure regulating valve to supply fluid to urge said movable element to move in one direction; biasing means providing a biasing force to urge said movable element to move in the opposite direction; said regulating valve having vent means operative in response to movement of said movable element in said one direction by said fluid from said supply line means to vent said supply line means and to movement in said opposite direction by said biasing force to close said vent means to regulate the fluid pressure in said supply line and said device; and means responsive to the fluid pressure in said portion of said supply line means proportional to said regulated fluid pressure regulated by said regulator valve operatively connected to said biasing means to provide, in response to said pressure at least as low as said predetermined low positive pressure value, a predetermined low biasing force and then a continuous gradual slope increase of said biasing force at a controlled slow rate of change over an extended period of time to control said regulator valve to provide initially said predetermined positive low pressure value and then to increase the fluid pressure in said supply line means and said device from said low initial value at a gradual slope rate of pressure increase to said high regulated pressure of said source over said extended period of time to gradually and softly engage said drive engaging device.

15. In a transmission; a fluid operated drive engaging device; a source of fluid under a high regulated pressure; supply line means connecting said source to said device having a pressure value the same under static conditions and proportional under flow conditions to the pressure value in said device; control valve means in said supply line means to control the supply of fluid from said source through said supply line means to said device to cause on the initiation of the supply of pressure fluid from said source to said device, a pressure drop in a portion of said supply line means to a pressure value at least as low as a predetermined low positive pressure value, a pressure regulating valve having a movable element, means to connect said supply line means to said pressure regulating valve to supply fluid to urge said movable element to move in one direction, biasing means providing a biasing force to urge said movable element to move in the opposite direction, said regulating valve having vent means connected to said supply line means both upstream and downstream of said regulator valve operative in response to movement of said movable element in said one direction by said fluid from said supply line means to vent said supply line means both upstream and downstream of said regulator valve and to movement in said opposite direction by said biasing force to close said vent means to regulate the fluid pressure in said entire supply line and said device, and means responsive to the fluid pressure in said portion of said supply line means proportional to said regulated fluid pressure regulated by said regulator valve operatively connected to said biasing means to provide, in response to said pressure drop to said pressure at least as low as said predetermined low positive pressure value, a predetermined low biasing force and then a continuous, gradual slope increase of said biasing force at a controlled slow rate of change over an extended period of time to control said regulator valve to provide initially said predetermined positive low pressure value and then to increase the fluid pressure in said supply line means and said device from said low initial value at a gradual slope rate of pressure increase to said high regulated pressure of said source over said extended period of time to gradually and softly engage said drive engaging device.

16. In a transmission; a fluid operated drive engaging device; a source of fluid under a high regulated pressure; supply line means connecting said source to said device having a pressure value the same under static conditions and proportional under flow conditions to the pressure value in said device; control valve means in said supply line means to control the supply of fluid from said source through said supply line means to said device to cause on the initiation of the supply of pressure fluid from said source to said device, a pressure drop in a portion of said supply line means to a pressure value at least as low as a predetermined low positive pressure value, a pressure regulating valve having a movable element, means to connect said supply line means to said pressure regulating valve to supply fluid to urge said movable element to move in one direction, biasing means providing a normal biasing force to urge said movable element to move in the opposite direction, said regulating valve having vent means connected to said supply line means both upstream and downstream of said regulator valve operative in response to movement of said movable element in said one direction by said fluid from said supply line means to vent said supply line means both upstream and downstream of said regulator valve and to movement in said opposite direction by said biasing force to close said vent means to regulate the fluid pressure in said entire supply line and said device at said predetermined low pressure, and means including an expansible chamber motor and orifice supply means connecting said portion of said supply line means to said motor to actuate said motor means by the fluid pressure in said portion of said supply line means proportional to said regulated fluid pressure regulated by said regulator valve in response to said pressure drop to said pressure at least as low as said predetermined low positive pressure value to collapse said motor means and to gradually expand said motor means, said motor means being operatively connected to said biasing means to provide said predetermined low biasing force and then a continuous, gradual slope increase of said biasing force at a controlled slow rate of change over an extended period of time, and said biasing force being operatively connected to control said regulator valve to provide initially said predetermined positive low pressure value and then to increase the fluid pressure in said supply line means and said device from said low initial value at a gradual slope rate of pressure increase to said high regulated pressure of said source over said extended period of time to gradually and softly engage said drive engaging device.

17. In a transmission; a fluid operated drive engaging device; a source of fluid under a high regulated pressure; supply line means connecting said source to said device having a pressure value the same under static conditions and proportional under flow conditions to the pressure value in said device; control valve means in said supply line means to control the supply of fluid from said source through said supply line means to said device to cause on the initiation of the supply of pressure fluid from said source to said device, a pressure drop in a portion of said supply line means to a pressure value at least as low as a predetermined low positive pressure value, a pressure regulating valve having a movable element, means to connect said supply line means to said pressure regulating valve to supply fluid to urge said movable element to move in one direction, biasing means providing a normal biasing force to urge said movable element to move in the opposite direction, said regulating valve having vent means connected to said supply line means both upstream and downstream of said regulator valve operative in response to movement of said movable element in said one direction by said fluid from said supply line means to vent said supply line means both upstream and downstream of said regulator valve and to movement in said opposite direction by said biasing force to close said vent means to regulate the fluid pressure in said entire supply line and said device at said predetermined low pressure, and means including an expansible chamber motor expansible from a fully collapsed position to a fully expanded position, and uniform orifice supply means connecting said portion of said supply line means to said motor to maintain said motor means filled regardless of the pressure in said supply line means and to actuate said motor means by the fluid pressure in said portion of said supply line means proportional to said regulated fluid pressure regulated by said regulator valve in response to said pressure drop to said pressure at least as low as said predetermined low positive pressure value to collapse said motor means and to gradually expand said motor means throughout the period of flow through said uniform orifice supply means, said motor means being operatively connected to said biasing means to provide said predetermined low biasing force and then a continuous, gradual slope increase of said biasing force at a controlled slow rate of change over an extended period of time, and said biasing force being operatively connected to control said regulator valve to provide initially said predetermined positive low pressure value and then to increase the fluid pressure in said supply line means and said device from said low initial value at a gradual slope rate of pressure increase to said high regulated pressure of said source over said extended period of time to gradually and softly engage said drive engaging device.

References Cited in the file of this patent

UNITED STATES PATENTS

| | | |
|---|---|---|
| 2,935,999 | Hock et al. | Mar. 10, 1960 |
| 2,939,557 | Dabich et al. | June 7, 1960 |
| 2,941,639 | Christenson et al. | June 21, 1960 |